(12) United States Patent
Bayer et al.

(10) Patent No.: US 8,847,453 B2
(45) Date of Patent: Sep. 30, 2014

(54) ROTOR AND METHOD FOR MANUFACTURING A ROTOR OF AN ELECTRIC MACHINE

(75) Inventors: Heiner Bayer, Olching (DE); Ludwig Erd, Berlin (DE); Ulrich Hartmann, Berlin (DE); Torsten Metzner, Berlin (DE); Axel Möhle, Berlin (DE)

(73) Assignee: Siemens Aktiengesellschaft, München (DE)

( * ) Notice: Subject to any disclaimer, the term of this patent is extended or adjusted under 35 U.S.C. 154(b) by 183 days.

(21) Appl. No.: 13/381,575

(22) PCT Filed: May 6, 2010

(86) PCT No.: PCT/EP2010/056182
§ 371 (c)(1),
(2), (4) Date: Dec. 29, 2011

(87) PCT Pub. No.: WO2011/000617
PCT Pub. Date: Jan. 6, 2011

(65) Prior Publication Data
US 2012/0098271 A1 Apr. 26, 2012

(30) Foreign Application Priority Data
Jul. 1, 2009 (DE) .......................... 10 2009 031 371

(51) Int. Cl.
*H02K 1/27* (2006.01)
*H01F 7/02* (2006.01)
*H02K 15/03* (2006.01)
*H02K 7/18* (2006.01)
*H02K 1/04* (2006.01)

(52) U.S. Cl.
CPC .............. *H02K 15/03* (2013.01); *H02K 7/1838* (2013.01); *H01F 7/0221* (2013.01); *H02K 1/04* (2013.01); *H02K 1/27* (2013.01); *H02K 1/2786* (2013.01)
USPC ............. 310/156.21; 310/154.07; 310/156.56

(58) Field of Classification Search
CPC ............................ H02K 1/278; H02K 1/2733
USPC ............. 310/156.21, 154.07, 156.53, 156.56; 29/598
See application file for complete search history.

(56) References Cited

U.S. PATENT DOCUMENTS 3,866,073 A * 2/1975 Gjaja ............................ 310/260
4,587,449 A 5/1986 West
(Continued)

FOREIGN PATENT DOCUMENTS

DE 69800792 T2 7/1999
(Continued)

OTHER PUBLICATIONS

Machine translation of DE102005032721, Klaussner et al., Jan. 2007.*
(Continued)

*Primary Examiner* — Terrance Kenerly
(74) *Attorney, Agent, or Firm* — Henry M. Feiereisen LLC

(57) ABSTRACT

The invention relates to methods for manufacturing a rotor (14) for an electric machine (13), having the following method steps: a) manufacturing a magnetic element (8) by bonding permanent magnets (1, 1', 1", 1''') by means of a first adhesive, each permanent magnet (1, 1', 1", 1''') having a side with a magnetic North pole (N) and a side with a magnetic South pole (S), the permanent magnets (1, 1', 1", 1''') being arranged during bonding such that the sides of the magnetic North poles (N) or the sides of the magnetic South poles (S) form a common underside (3, 3', 3", 3''') of the magnetic elements (8), the first adhesive having a hard consistency in the cured state; and b) bonding the underside of the magnetic element (8) to a yoke (12) by means of a second adhesive, the second adhesive being soft and elastic in the cured state. Furthermore, the invention relates to an associated rotor. The invention permits rational manufacture of a rotor having a permanent magnet for a machine, the permanent magnets being integrally fixed to the yoke of the rotor with high reliability.

14 Claims, 3 Drawing Sheets

(56) References Cited

U.S. PATENT DOCUMENTS

| | | | |
|---|---|---|---|
| 5,457,870 A * | 10/1995 | Canders | 29/598 |
| 5,744,887 A * | 4/1998 | Itoh | 310/156.28 |
| 5,861,695 A | 1/1999 | Brassard | |
| 6,737,775 B2 | 5/2004 | Hatz et al. | |
| 6,963,151 B2 * | 11/2005 | Van Dine | 310/87 |
| 7,030,530 B2 | 4/2006 | Malmberg et al. | |
| 7,116,026 B2 | 10/2006 | Hase et al. | |
| 7,786,643 B2 | 8/2010 | Möhle et al. | |
| 7,816,832 B2 | 10/2010 | Bade et al. | |
| 7,825,839 B2 | 11/2010 | Bratfisch et al. | |
| 2002/0041128 A1 * | 4/2002 | Nishiyama et al. | 310/156.53 |
| 2007/0090708 A1 * | 4/2007 | Takahashi et al. | 310/156.21 |
| 2007/0096581 A1 * | 5/2007 | Zepp et al. | 310/191 |
| 2008/0272669 A1 | 11/2008 | Möhle et al. | |
| 2009/0091210 A1 | 4/2009 | Bade et al. | |
| 2010/0194226 A1 | 8/2010 | Metzner et al. | |
| 2010/0239441 A1 | 9/2010 | Bade et al. | |
| 2011/0163550 A1 | 7/2011 | Möhle et al. | |
| 2012/0056571 A1 | 3/2012 | Buse et al. | |

FOREIGN PATENT DOCUMENTS

| | | | |
|---|---|---|---|
| DE | 198 200 33 A1 | 11/1999 | |
| DE | 198 200 33 C2 | 12/2001 | |
| DE | 10 2004 058 451 A1 | 6/2006 | |
| DE | 10 2004 062 753 A1 | 7/2006 | |
| DE | 10 2005 032 721 A1 | 1/2007 | |
| DE | 10 2006 048 966 A1 | 4/2008 | |
| EP | 1 427 088 A2 | 6/2004 | |
| EP | 1 922 801 B1 | 10/2010 | |
| JP | 2006109676 * | 4/2006 | H02K 1/27 |
| RU | 2264022 C1 | 11/2005 | |
| RU | 2266605 C2 | 12/2005 | |
| SU | 1530105 A3 | 12/1989 | |
| WO | WO 02/103882 A1 | 12/2002 | |

OTHER PUBLICATIONS

Magnet bonding, Loctite Americas, www.Loctite.com; Others.

* cited by examiner

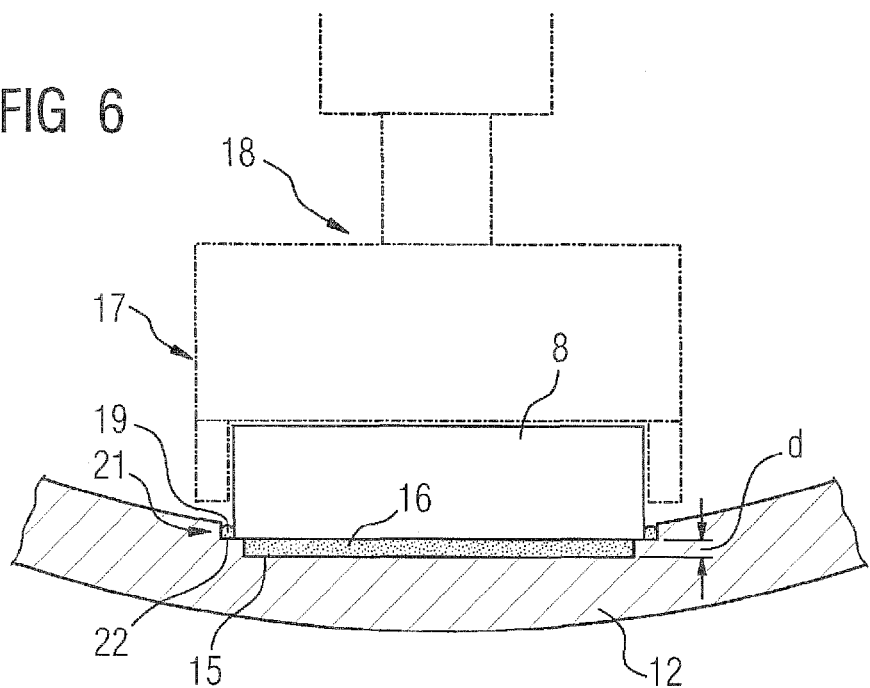
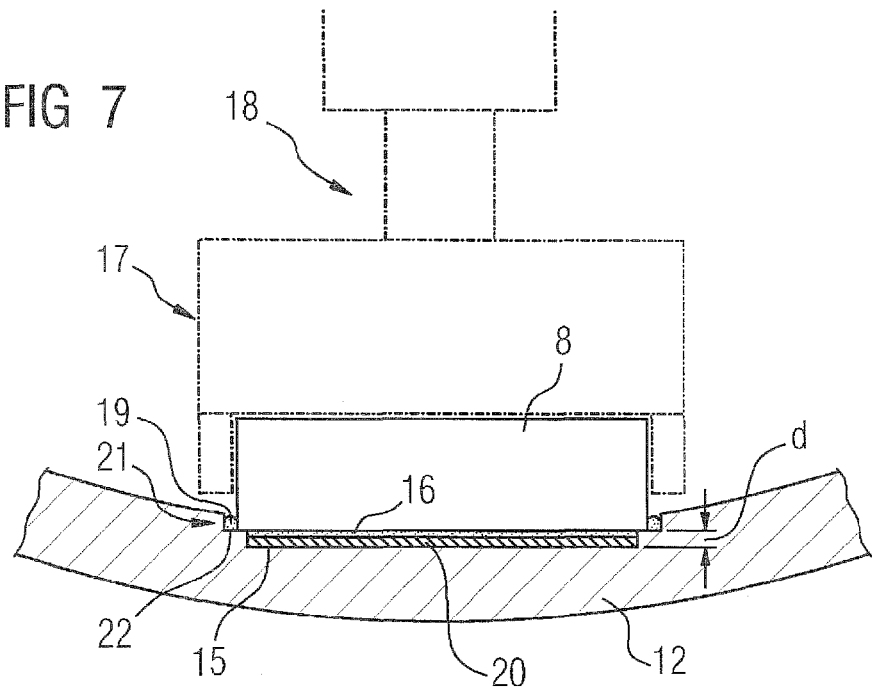

ROTOR AND METHOD FOR MANUFACTURING A ROTOR OF AN ELECTRIC MACHINE

CROSS-REFERENCES TO RELATED APPLICATIONS

This application is the U.S. National Stage of International Application No. PCT/EP2010/056182, filed May 6, 2010, which designated the United States and has been published as International Publication No. WO 2011/000617 and which claims the priority of German Patent Application, Serial No. 10 2009 031 371.0, filed Jul. 1, 2009, pursuant to 35 U.S.C. 119(a)-(d).

The invention relates to a method for manufacturing a rotor of an electric machine. Furthermore, the invention relates to an associated rotor of an electric machine.

In many electric machines such as e.g. electric motors or generators, the moving rotor has permanent magnets which have to be mounted on the yoke of the rotor as retrospective magnetization of the permanent magnets is not usually possible. Furthermore, depending on the operating conditions, it is frequently necessary for the permanent magnets to be protected against environmental conditions such as e.g. moisture and corrosive media. These requirements conflict with low-cost rational production, particularly if large quantities are produced.

In rotors, the bonding of permanent magnets with additional straps as a safeguard against becoming detached from the yoke of the rotor and protection from environmental influences is known from the prior art. In this case, the rotor is wrapped round with straps. After the wrapping round of the rotor, the straps are soaked with a resin, which then cures. The straps in conjunction with the resin achieve a mechanically resilient fastening of the permanent magnets to the yoke.

The bonding/casting of permanent magnets in hoods and the fastening of the hoods to carrier plates, as well as the fastening of the carrier plate to the yoke of the rotor are also known. Multiple carrier plates are arranged behind one another in an axial direction of the yoke. The individual fastenings are implemented here by means of force-locking and/or form-locking connections.

Furthermore, it is known, particularly in smaller machines for the permanent magnets to be arranged in pockets inside the yoke of the rotor, into which pockets the permanent magnets are inserted and bonded. The actual force-bearing fastening of the permanent magnets is implemented here through the form-locking connection implemented in the form of the pocket. The bonded connection serves merely to prevent displacement of the permanent magnets in an axial direction inside the pockets.

From DE 10 2004 062 753, a varnishing system is described which can be used in the uncured state as a mounting adhesive for permanent magnets. Here very specific mounting procedures and temperature increases are needed.

From DE 10 2004 058 451, a bonding method for manufacturing a permanent magnet is known.

DE 198 200 33 discloses a bonding process for manufacturing permanent magnets.

Furthermore, from a publication by the company LOCTITE, the bonding of permanent magnets by means of a range of different adhesives is known.

SUMMARY OF THE INVENTION

The object of the invention is to enable rational manufacture of a machine rotor equipped with permanent magnets, the permanent magnets being integrally fastened with high reliability to the yoke of the rotor.

This object is achieved in a method for manufacturing a rotor for an electric machine, having the following method steps:

a) manufacturing a magnetic element by bonding permanent magnets to one another by means of a first adhesive, each permanent magnet having a side with a magnetic North pole and a side with a magnetic South pole, the permanent magnets being arranged during bonding such that the sides of the magnetic North poles or the sides of the magnetic South poles form a common underside of the magnetic element, the first adhesive having a hard consistency in the cured state, and b) bonding the underside of the magnetic element to a yoke by means of a second adhesive, the second adhesive being soft and elastic in the cured state.

Furthermore, this object is achieved in a rotor for an electric machine, the rotor having magnetic elements and a yoke, the magnetic elements each having permanent magnets, each permanent magnet having a side with a magnetic North pole and a side with a magnetic South pole, the permanent magnets of a magnetic element being bonded to one another by means of a first adhesive such that the sides of the magnetic North poles or the sides of the magnetic South poles form a common underside of the magnetic element, the first adhesive having a hard consistency in the cured state, the underside of the magnetic elements being bonded to the yoke by means of a second adhesive, the second adhesive being soft and elastic in the cured state.

It should expressly be noted here that in the invention, the magnetic elements and in particular the permanent magnets are connected exclusively via a bonded connection, by means of the second adhesive, to the yoke, in particular to the surface of the yoke. The magnetic elements and in particular the permanent magnets are fastened to the yoke exclusively by means of the second adhesive. Consequently, no form-locking and/or force-locking connections for achieving the connection are involved in the inventive fastening of the magnetic elements and in particular of the permanent magnets to the yoke. It should at the same time be noted that the magnetic force of attraction generated by the permanent magnets on the yoke does not constitute a fastening or connection with the yoke within the meaning of the invention.

Advantageous embodiments of the method will emerge from the dependent claims. Advantageous embodiments of the rotor will emerge analogously to the advantageous embodiments of the method and vice versa.

It proves advantageous if the first adhesive is a fast-curing adhesive, since the magnetic elements can then be produced particularly quickly.

It proves advantageous if the second adhesive is embodied as a silicon adhesive. A silicon adhesive is easier to process and is elastic and soft in the cured state. Silicon adhesives are generally also used as sealants.

It also proves advantageous if the thickness of the adhesive layer between underside of the magnetic element and the yoke is 0.4 mm to 4 mm. If the thickness of the adhesive layer between underside of the magnetic element and the yoke is 0.4 mm to 4 mm, the magnetic element can, if the temperature increases, to a large extent expand differently relative to the yoke without this resulting in a rupture of the second adhesive or the magnetic material or in detachments.

It also proves advantageous if, after execution of method step a), a cap is bonded by means of the second adhesive to the top side of the magnetic element, the cap having side parts which are bonded by means of the second adhesive to the side surfaces of the magnetic element. Through this measure it can be achieved that the magnetic element is fully enveloped by the second adhesive and consequently the permanent magnets reliably protected from harmful environmental influences such as e.g. moisture or corrosive media penetrating the rotor.

It also proves advantageous if the rotor is embodied as an external rotor and the magnetic element is arranged on the inside of the yolk. In external rotors, such an arrangement constitutes a normal arrangement of the magnetic element.

It also proves advantageous if, at the point at which the magnetic element is bonded to the yoke, the yoke has a soft and elastic layer. Through this measure, the thickness of the bonding layer of the second adhesive can be reduced and consequently the time until curing of the second adhesive can be shortened, which enables particularly fast manufacture of the rotor.

Furthermore, it proves advantageous if, at the point at which the magnetic element is bonded to the yoke, the yoke has a recess for receiving the magnetic element. The magnetic element can then be positioned particularly easily.

It also proves advantageous if the recess has at least two steps. By embodying the recess as a two-step recess, particularly simple and fast production of the rotor can be undertaken, and a constant thickness of the adhesive layer between magnetic element and yoke can be achieved in a simple way.

It also proves advantageous if the first and the second adhesive cure at room temperature. This enables particularly simple and consequently rational production of the rotor.

An electric machine which has the inventive rotor also proves advantageous. The electric machine is usually embodied as a generator or an electric motor, it being possible in one embodiment of the electric machine for the electric machine to be embodied e.g. as a wind-powered generator.

BRIEF DESCRIPTION OF THE DRAWINGS

Two exemplary embodiments of the invention are shown in the drawings and will be explained in detail below:

FIG. 6 shows a schematicized detailed view of a section of the rotor with a depositing device for a magnetic element, FIG. 7 shows a schematicized detailed view of a section of the rotor with a depositing device for a magnetic element within the scope of a further embodiment of the invention.

DETAILED SESCRIPTION OF THE PREFERRED EMBODIMENTS

Figure 1:
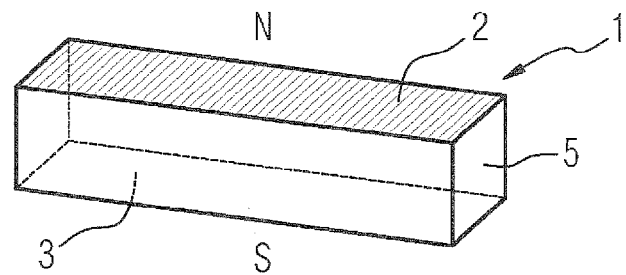
FIG. 1 shows a perspective diagram of a permanent magnet.

FIG. 1 shows in the form of a perspective diagram a permanent magnet 1. The permanent magnet 1 has a magnetic North pole and a magnetic South pole. The magnetic North pole is arranged within the scope of the diagram according to FIG. 1 on the top side 2 of the permanent magnet 1, i.e. the magnetic field lines emerge on the top side 2 from the permanent magnet 1, and the magnetic South pole is arranged on the underside 3 of the permanent magnet 1, i.e. the magnetic field lines enter the underside 3 of the permanent magnet 1. In such a way, the permanent magnet 1 has one side with a magnetic North pole and one side with a magnetic South pole, the two sides being arranged opposite one another. Furthermore, the permanent magnet 1 has a front side 5.

Figure 2:
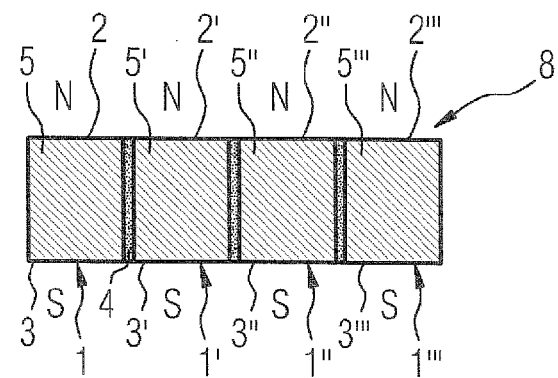
FIG. 2 shows a schematicized sectional view of a magnetic element.

As part of a first method step for manufacturing a rotor of an electric machine, a magnetic element 8, which is shown in FIG. 2 in a schematicized sectional view, is manufactured from a number of the permanent magnets shown in FIG. 1. The manufacture of the magnetic element 8 is achieved by bonding the permanent magnets 1, 1', 1" and 1'" to one another by means of a first adhesive, the permanent magnets being arranged in the exemplary embodiment during bonding such that the sides of the magnetic South poles, i.e. in the exemplary embodiment the undersides 3, 3', 3" and 3'", form a common underside of the magnetic element 8. As an alternative to this, the permanent magnets could also be arranged during bonding such that the sides of the magnetic North poles form a common underside of the magnetic element 8.

FIG. 2 shows a schematicized sectional view of the magnetic element 8 produced hereby, the front sides 5, 5', 5" and 5'" of the individual magnetic elements being shown in a view from the front of the front sides 5, 5', 5" and 5'". An adhesive layer 4, which consists of the first adhesive, is arranged between each of the individual magnetic elements. It should be noted that in FIG. 2 and in the subsequent figures the thickness of the adhesive layer 4 is shown enlarged compared with reality.

The first adhesive is in the cured state, i.e. it has a hard consistency like e.g. the consistency of a die made of plexiglass or like e.g. the consistency of a hard furniture varnish or like e.g. the consistency of a plastic housing of a mobile phone. Since the individual permanent magnets 1, 1', 1" and 1'" strongly repel one another, the first adhesive, which is hard after curing and thus inelastic, prevents, after the curing of the first adhesive, the individual permanent magnets from being able to move away from one another, as would have been the case, at least to a small extent, if a soft and elastic adhesive had been used. In order to enable particularly fast and thus particularly rational manufacture of the rotor, the first adhesive is preferably a fast-curing, in particular a highly rigid, adhesive, so the individual permanent magnets have to be pressed together by an appropriate device during bonding only for a short time during curing until a defined degree of curing of the first adhesive is attained. As already mentioned, the first adhesive is a fast-curing adhesive, i.e. the first adhesive reaches a strength, no later than after 5 minutes, preferably no later than after 2 minutes, that is adequate for the permanent magnets, despite their force of mutual magnetic repulsion of up to 0.5 N/mm$^2$ adhesive surface, to remain connected to one another when the device which presses the permanent magnets together during bonding is removed. The final strength of the first adhesive may not be reached until after a few hours. Suitable for use as the first adhesive are e.g. the adhesive LOCTITE® 648 with associated activator of the adhesive produced by LOCTITE or e.g. the two-component no-mix adhesive Bondmaster® 533 produced by Bondmaster.

The two adhesives mentioned cure at room temperature, which permits particularly easy manufacture. Heating and cooling of the permanent magnets is consequently not necessary for bonding.

As a result of the first manufacturing step, a magnetic element 8 is obtained. Since a number of such magnetic elements 8 are needed for a rotor, the first step is preferably repeated as often as is required until all the magnetic elements needed for the rotor have been manufactured.

Figure 3:
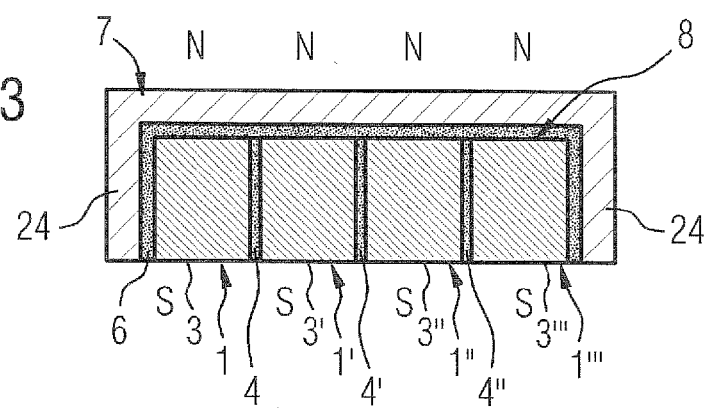
FIG. 3 shows a schematicized sectional view of a magnetic element equipped with a cap.

In an advantageous embodiment of the invention, a cap 7 is bonded to the magnetic element 8 in a further step in an exemplary embodiment, which is shown in FIG. 3 in a schematicized sectional diagram. The same elements are labeled with the same reference characters in FIG. 3 as in FIG. 1 and FIG. 2.

The cap 7 is placed on the top side of the magnetic element 8, this top side being formed, as shown in FIG. 2 by the top sides 2, 2', 2" and 2''' of the individual permanent magnets. The cap 7 is bonded by means of a second adhesive with the top side of the magnetic element 8. The cap 7 has side parts 24 running downwards which are bonded by means of the second adhesive to the side surfaces of the magnetic element 8. An adhesive layer 6 consisting of the second adhesive is arranged, as shown in FIG. 2, between the cap 7 and the magnetic element 8. It should be noted that in FIG. 3 and in the subsequent FIG. 4, the thickness of the adhesive layer 6 is shown enlarged compared with reality.

Figure 4:
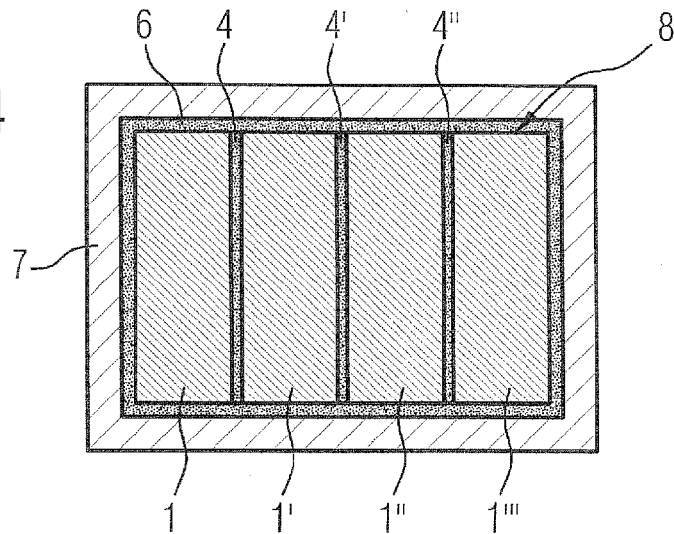
FIG. 4 shows a schematicized sectional view of a magnetic element equipped with a cap, in a view of the magnetic element from below.

FIG. 4 shows the magnetic element 8 produced in such a way in a schematicized sectional view from below of the magnetic element 8. The same elements are denoted by the same reference characters as in FIG. 2 or FIG. 3.

The second adhesive is an adhesive which in the cured state is soft and elastic, i.e. has a soft consistency and is elastic. The second adhesive is preferably embodied as a silicon adhesive. For example, the adhesive DOW CORNING® Q3-3526 with associated adhesive catalyst produced by DOW CORNING or the adhesive RT 778/T78 produced by Wacker can be used as a second adhesive.

Soft and elastic are understood within the scope of the invention to mean e.g. the normal consistency of a cured silicon adhesive, i.e. the consistency of an elastomer. The second adhesive is embodied in such a way as a rubber-like substance.

The different expansions of the magnetic element and of the yoke occurring during heating because of the different materials used for the Cap 7 and the permanent magnets are offset by the second adhesive such that the cap 7 retains its form even e.g. when the temperature of the magnetic element 8 is increased.

The adhesive layer 6 and the cap 7 form an effective protection of the permanent magnets from moisture penetrating the rotor or against corrosive media such as e.g. corrosive gases.

It should be noted at this point that the magnetic element furnished with the cap is still referred to hereinbelow as the magnetic element and is labeled by the reference character "8".

The production of the magnetic elements, as described in FIGS. 1 to 4, can take place in advance of the actual equipping of the yoke of the rotor with the magnetic elements so that the magnetic elements which are needed for manufacture of the yoke are already all present, i.e. available, when the magnetic elements are mounted on the yoke of the rotor, which enables particularly rational manufacture of the rotor.

Figure 5:
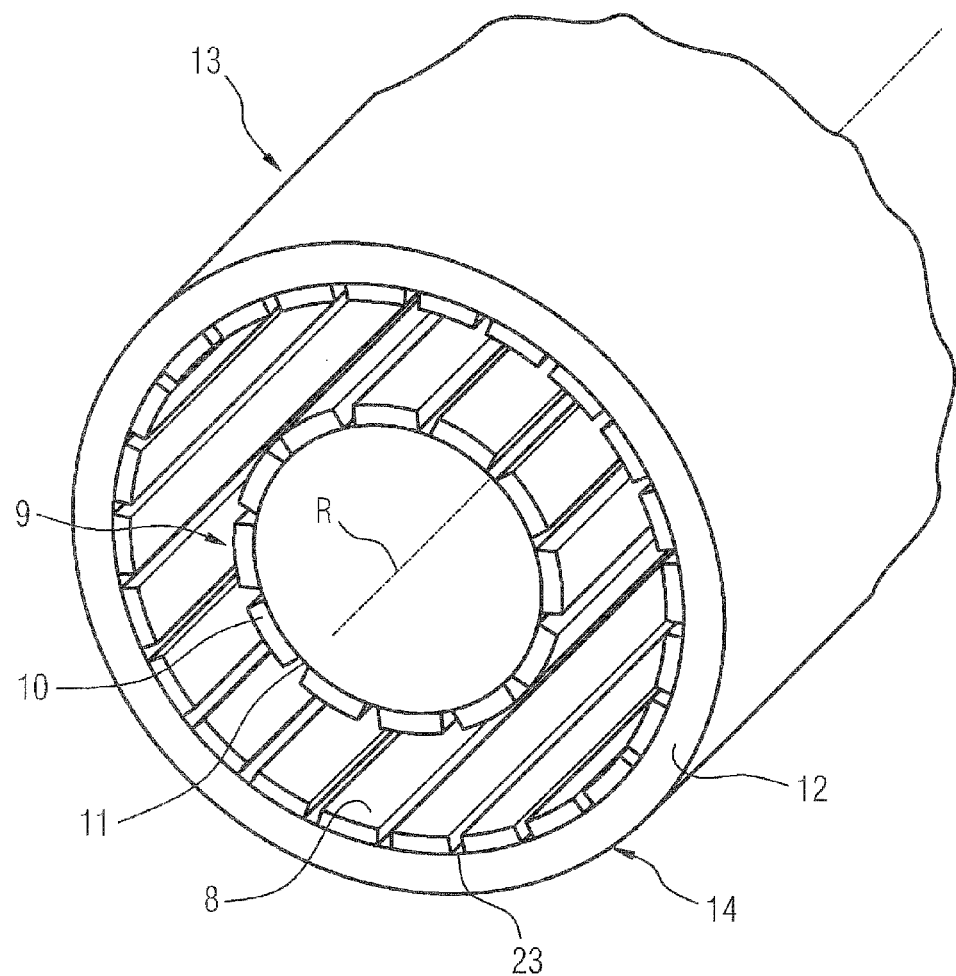
FIG. 5 shows a machine having a rotor according to the invention.

FIG. 5 shows in the form of a schematicized perspective diagram a machine 13, which may be embodied e.g. as an electric motor or generator.

The machine 13 has an immovably arranged stator 9, which has windings 10 arranged on a stator support 11. For the sake of clarity, only one winding 10 is labeled by a reference character. The windings are, in the schematicized diagram according to FIG. 5, shown only symbolically in the form of rectangular boxes.

About the stator 9, there is arranged, rotatably relative to the stator 9, an inventive rotor 14. The rotor 14 rotates about an axis of rotation R. The rotor 14 has, as a key element, a yoke 12 made of a preferably magnetically soft material, wherein the yoke can be of a solid design or else have multiple sheets arranged behind one another in the direction of the axis of rotation R. The yoke can optionally have add-on elements as an integral part of the yoke. The sheets are arranged so as to be electrically insulated from one another. Furthermore, the rotor 14 also has as key elements the previously described magnetic elements, for the sake of clarity in FIG. 5 only one magnetic element 8 being labeled by a reference character. In the exemplary embodiment, the magnetic elements are arranged on the inside 23 of the yoke 12, the rotor being embodied as an external rotor, i.e. the stator is located in the interior, and the rotor is arranged around the stator.

In an embodiment of the machine 13 in which the rotor is embodied as an internal rotor, i.e. the rotor is located in the interior, and the stator is arranged around the rotor, the permanent magnets can also be arranged on the outside of the yoke.

To manufacture the rotor 14, the magnetic element 8 and subsequently also the other magnetic elements are connected to the yoke 12. This is achieved according to the invention by bonding the underside of the magnetic element 8 to the yoke, in particular to the surface of the yoke, by means of the second adhesive. Since the second adhesive, as already mentioned, has in the cured state a soft and elastic consistency, when the temperature increases different expansions of the magnetic element 8 and of the yoke 12, which is normally produced from a ferrous metal, that occur do not lead to rupturing of the second adhesive. In order optimally to offset the different thermal expansions between the permanent magnets of the magnetic element 8 and the yoke 12, the thickness of the adhesive layer made of the second adhesive between the underside of the magnetic element and the yoke is preferably 0.4 mm to 4 mm. Particularly when the adhesive layer is of this thickness, firstly no cracks form in the adhesive layer and secondly a curing period for the second adhesive is provided that is acceptable for manufacturing the rotor.

FIG. 6 shows the yoke 12 and the magnetic element 8 in the form of a schematicized diagram. The yoke 12 has, at the point at which the magnetic element 8 is bonded to the yoke, a recess 21 for receiving the magnetic element 8. Within the scope of the exemplary embodiment the recess 21 preferably has two steps which penetrate the yoke 12 to different depths, the second step 15 having a thickness d. Within the scope of the exemplary embodiment, the second adhesive is poured into the second step 15 during bonding until it has completely filled the second step and the adhesive layer 16 produced in such a way is preferably slightly thicker than the thickness d of the second step 15 of the recess 21. The magnetic element 8 is then deposited for bonding by a grab 17 of a depositing device 18 onto the first step 22 of the recess 21. The widths of the first step 22 and of the second step 15 are designed here, i.e. adapted to the dimensions of the magnetic element 8, such that the magnetic element 8 lies on the first step 22. When the magnetic element 8 is deposited, excess second adhesive is displaced and arranges itself laterally (reference element 19) on the magnetic element 8 and on the yoke 12. The choice of thickness d of the second step 15 makes it possible for the thickness of the second adhesive, by means of which the magnetic element 8 is connected to the yoke 12, to be established in a simple manner.

It should be noted at this point that the recess 21 does not necessarily have to be present. At the point at which the magnetic element 8 is to be connected to the yoke 12, the yoke 12 can e.g. also have the second adhesive applied to it, and the depositing device 18 then lowers the magnetic element 8 far enough into the second adhesive for the desired thickness of the adhesive layer to be achieved and then holds the magnetic element at this position until the second adhesive has cured.

It should furthermore be noted at this point that instead of a step other spacers are possible.

The second adhesive fully encloses the permanent magnets, which are usually embodied as rare-earth permanent magnets, and thereby provides a secure protective layer that protects the permanent magnets from external environmental influences (media such as e.g. liquids or gases) which can damage the permanent magnets.

FIG. 7 shows a further embodiment of the invention which essentially matches the embodiment of the invention described in FIG. 6. The same elements are denoted in FIG. 7 with the same reference characters as in FIG. 6. The single substantial difference in the embodiment of the invention according to FIG. 7 compared with FIG. 6 is that a soft and elastic layer 20 has been applied adhesively in advance and is consequently arranged in the recess 21. The soft and elastic layer 20 consists here e.g. of the second adhesive that is already cured. The bonding of the underside of the magnetic element 8 to the yoke 12 is implemented such that preferably only a thin layer of the second adhesive is applied to the soft and elastic layer 20, which generally shortens the time until the bonding compound has cured. Of course, a thicker layer of the second adhesive can, however, also be applied to the soft and elastic layer 20.

Furthermore, in this embodiment of the invention too, the magnetic element 8 can, even without the presence of a recess 28, as described in the previous embodiment, of course be connected to the yoke 12 by means of the second adhesive.

It should be noted at this point that, of course, if required in the invention, the yoke 12, at the points at which the magnetic elements are to be attached, in order to implement a planar surface so that the magnetic elements can be bonded particularly well to the yoke 12 there, the yoke as an integral part of the yoke can have a magnetic element support furnished with a planar surface as an add-on element which is connected to a further element of the yoke (e.g. to the sheets of the yoke) e.g. by means of a screw connection or a form-locking connection. The magnetic elements and, in particular, the permanent magnets are fastened to the magnetic element support of the yoke and thus to the yoke exclusively by means of the second adhesive. To implement the fastening, no form-locking and/or force-locking connections are consequently involved in the inventive fastening of the magnetic elements, and in particular of the permanent magnets, to the magnetic element support of the yoke and thus to the yoke.

It should furthermore be noted at this point that the rotor, e.g. in an embodiment of the machine as a linear motor, can also execute a translational movement.

The machine has, within the scope of the exemplary embodiments, a power greater than 10 kW and in particular greater than 1 MW. It is particularly in such relatively large machines that, due to the large forces of repulsion and attraction of the permanent magnets, the manufacture of a rotor according to the method known from the prior art for implementing the connection of the magnetic elements to the yoke by means of force-locking and/or form-locking connections is time-consuming and expensive. In such relatively large machines, the invention is therefore particularly advantageous.

The invention claimed is:

1. A method for manufacturing a rotor for an electric machine, comprising:
    bonding permanent magnets to one another by a first adhesive to form a magnetic element, wherein each permanent magnet has a side with a magnetic North pole and a side with a magnetic South pole, wherein the permanent magnets are arranged during bonding such that the sides of the magnetic North poles or the sides of the magnetic South poles from a common underside of the magnetic element, and wherein the first adhesive has a hard consistency in a cured state to prevent the permanent magnets from moving away from one another, and
    bonding the underside of the magnetic element to a soft and elastic layer of the yoke by a second adhesive, wherein the second adhesive in a cured state is soft and elastic to resist a rupturing caused by a difference between an expansion of the yoke and an expansion of the magnetic element when being exposed to an increased temperature.

2. The method of claim 1, wherein the first adhesive is a fast-curing adhesive.

3. The method of claim 1, wherein the second adhesive is a silicon adhesive.

4. The method of claim 1, wherein the soft and elastic layer of the yoke and the second adhesive form an adhesive layer between the underside of the magnetic element and the yoke, said adhesive layer defined by a thickness between 0.4 mm and 4 mm.

5. The method of claim 1, further comprising bonding a cap to a top side of the magnetic element by the second adhesive after bonding the permanent magnets to one another, and bonding side parts of the cap to side surfaces of the magnetic element using the second adhesive.

6. The method of claim 1, wherein the rotor is constructed as an external rotor, with the magnetic element being arranged on the inner side of the yoke.

7. The method of claim 1, wherein the yoke has a recess at a point of bond between the magnetic element and the yoke for receiving the magnetic element.

8. The method of claim 7, wherein the recess has at least two steps.

9. The method of claim 1, wherein the first and second adhesives cure at room temperature.

10. A rotor for an electric machine, comprising:
    a magnetic element having permanent magnets, each of which having a side with a magnetic North pole and a side with a magnetic South pole, said permanent magnets being bonded to one another by a first adhesive such that the sides of the magnetic North poles or the sides of the magnetic South poles form a common underside of the magnetic element, wherein the first adhesive has a hard consistency in a cured state to prevent the permanent magnets from moving away from one another; and
    a yoke, wherein the underside of the magnetic element is bonded to a soft and elastic layer of the yoke by a second adhesive, said second adhesive being soft and elastic in a cured state to resist a rupturing caused by a difference between an expansion of the yoke and an expansion of the magnetic element when being exposed to an increased temperature.

11. An electric machine, comprising the rotor, said rotor comprising
    a magnetic element having permanent magnets, each of which having a side with a magnetic North pole and a side with a magnetic South pole, said permanent magnets being bonded to one another by a first adhesive such that the sides of the magnetic North poles or the sides of the magnetic South poles form a common underside of the magnetic element, wherein the first adhesive has a hard consistency in a cured state to prevent the permanent magnets from moving away from one another; and
    a yoke, wherein the underside of the magnetic element is bonded to a soft and elastic layer of the yoke by a second adhesive, said second adhesive being soft and elastic in a cured state to resist a rupturing caused by a difference between an expansion of the yoke and an expansion of the magnetic element when being exposed to an increased temperature.

12. The electric machine of claim 11, constructed in the form of a generator.

13. The electric machine of claim 12, wherein the generator is wind-powered.

14. The electric machine of claim 11, constructed in the form of an electric motor.

* * * * *